(12) United States Patent
Hsieh (10) Patent No.: US 11,625,345 B2
(45) Date of Patent: *Apr. 11, 2023

(54) METHODS, FLASH MEMORY CONTROLLER, AND ELECTRONIC DEVICE FOR SD MEMORY CARD DEVICE

(71) Applicant: SILICON MOTION INC., Zhubei (TW)

(72) Inventor: Chao-Kuei Hsieh, New Taipei (TW)

(73) Assignee: SILICON MOTION INC., Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,889

(22) Filed: Nov. 30, 2021

(65) Prior Publication Data

US 2022/0083481 A1 Mar. 17, 2022

Related U.S. Application Data

(63) Continuation of application No. 16/698,910, filed on Nov. 27, 2019, now Pat. No. 11,232,048.

(30) Foreign Application Priority Data

Jan. 18, 2019 (TW) ................ 108101896

(51) Int. Cl.
*G06F 3/00* (2006.01)
*G06F 13/16* (2006.01)
*G06F 13/42* (2006.01)

(52) U.S. Cl.
CPC ...... *G06F 13/1668* (2013.01); *G06F 13/4282* (2013.01); *G06F 2213/0026* (2013.01)

(58) Field of Classification Search
CPC .. G06F 13/00; G06F 13/1668; G06F 13/4282; G06F 2213/0026
See application file for complete search history.

(56) References Cited

U.S. PATENT DOCUMENTS

| 2005/0086434 A1 | 4/2005 | Kang et al. |
| 2005/0182881 A1 | 8/2005 | Chou et al. |

(Continued)

FOREIGN PATENT DOCUMENTS

| CN | 1471043 A | 1/2004 |
| CN | 101620514 A | 1/2010 |

(Continued)

OTHER PUBLICATIONS

International Search Report for PCT Application PCT/CN2019/126694 filed on Dec. 19, 2019. pp. 1-10.

(Continued)

*Primary Examiner* — Henry Tsai
*Assistant Examiner* — Kim T Huynh
(74) *Attorney, Agent, or Firm* — Duane Morris LLP (57) ABSTRACT

A method for controlling data transmission mode of an SD memory card device, which at least operates under an SD mode, includes: sending a first power signal from an electronic device to the SD memory card device via pin VDD1 to control and make the SD memory card device enter an initial state; and, sending a second power signal via one of a pin VDD2 and a pin VDD3 to the SD memory card device, to control and make the SD memory card device enter an Linkup state of a PCIe mode wherein a voltage level of the second power signal is lower than a voltage level of the first power signal.

5 Claims, 6 Drawing Sheets

(56) References Cited

U.S. PATENT DOCUMENTS

| | | | |
|---|---|---|---|
| 2007/0055823 A1 | 3/2007 | Jo et al. | |
| 2008/0301355 A1 | 12/2008 | Wang | |
| 2010/0312933 A1* | 12/2010 | Chou | G06F 13/385 |
| | | | 710/106 |
| 2011/0040918 A1 | 2/2011 | Pinto | |
| 2012/0159008 A1 | 6/2012 | Park | |
| 2016/0062652 A1 | 3/2016 | Hia et al. | |
| 2016/0188245 A1 | 6/2016 | Thadi Suryaprakash | |
| 2018/0088865 A1 | 3/2018 | Lee | |
| 2018/0276177 A1 | 9/2018 | Shiau | |
| 2018/0335971 A1 | 11/2018 | Borikar | |
| 2020/0090020 A1* | 3/2020 | Fujimoto | G06K 19/07733 |
| 2020/0233818 A1 | 7/2020 | Hsieh | |

FOREIGN PATENT DOCUMENTS

| | | |
|---|---|---|
| CN | 101697180 B | 7/2012 |
| CN | 102902489 A | 1/2013 |
| JP | 2017123156 A | 7/2017 |
| JP | 2018156506 A | 10/2018 |
| JP | 2018180769 A | 11/2018 |
| JP | 2018180770 A | 11/2018 |
| JP | 2019057229 A | 4/2019 |
| KR | 10-2012-0070372 A | 6/2012 |
| KR | 10-2018-0035333 A | 4/2018 |
| KR | 20180112831 A | 10/2018 |
| TW | I386946 B | 2/2013 |
| TW | I405087 | 8/2013 |
| TW | 201608467 A | 3/2016 |
| WO | 2006101057 A1 | 9/2006 |
| WO | 2018186456 A1 | 10/2018 |
| WO | 2018186457 A1 | 10/2018 |
| WO | 2018225327 A1 | 12/2018 |
| WO | 2019031295 A1 | 2/2019 |

OTHER PUBLICATIONS

First Office Action and Search Report dated Mar. 27, 2020 for related TW patent Application No. 100101896 in 6 pages. Machine Translation provided.

Zhang Junpeng, "Research on Implementation of SD Card Controller Based on PCIE Bus" Modern Business Trade Industry, No. 9, 2012, 2 pages; Machine translation of abstract provided.

Office Action in Korean Counterpart Application No. 10-2020-7014255, dated May 13, 2021, in 7 pages; English translation provided.

* cited by examiner

METHODS, FLASH MEMORY CONTROLLER, AND ELECTRONIC DEVICE FOR SD MEMORY CARD DEVICE

BACKGROUND OF THE INVENTION

1. Field of the Invention

The invention relates to a mechanism of controlling data transmission modes of a memory card device, and more particularly to a method of controlling data transmission modes of a secure digital (SD) memory card device and a corresponding electronic device.

2. Description of the Prior Art

Generally speaking, the types of memory card devices designed, produced or sold by different manufacturers on the market are different. The different memory card devices may respectively comprise different numbers of signal pins, and data transmission modes supported by the different memory card devices may be different. Also, the actual voltage values of the logic signal levels and voltage values of power supply levels specified by the input/output communication interface standards respectively employed by the different data transmission modes are different. Thus, when a memory card device is connected to a host, the circuits may be damaged if the data transmission mode of the host is different from that supported by the memory card device.

SUMMARY OF THE INVENTION

Therefore one of the objectives of the invention is to provide a method for controlling a data transmission mode of an SD memory card device, a corresponding electronic device, a method used in an SD memory card device, and a flash memory controller of an SD memory card device, to solve the above-mentioned problems of the prior art.

According to an embodiment, a method for controlling a data transmission mode of an SD memory card device is disclosed. The electronic device is used as a host and has a first external signal port. The SD memory card device is capable of operating an SD mode at least and has a second external signal port, and the SD memory card device is coupled to the electronic device via the first external signal port and the second external signal port. The method comprises: sending a first power signal corresponding to the SD mode from the electronic device to the SD memory card device via the first external signal port and a pin VDD1 of the second external signal port, to control and make the SD memory card device enter an initial state; and sending a second power signal from the electronic device to the SD memory card device via one of a pin VDD2 and a pin VDD3 of the second external signal port, to control and make the SD memory card device enter a Linkup state of a PCIe mode, a voltage level of the second power signal being lower than a voltage level of the first power signal. A plurality of pins, used for a data line, of an UHS-I input/output communication interface standard employed by the SD mode of the SD memory card device are shared by another input/output communication interface standard of a PCIe channel with an NVMe protocol employed by the PCIe mode, and the plurality of pins of the UHS-I input/output communication interface standard employed by the SD mode comprise pins of pin numbers 1, 7, 8, and 9.

According to an embodiment, an electronic device used to be coupled to an SD memory card device and capable of controlling a data transmission mode of the SD memory card device is disclosed. The electronic device is at a host and has a first external signal port. The SD memory card device at least operates under an SD mode and has a second external signal port. The electronic device comprises the first external signal port, a driving circuit, and a processor. The first external signal port has multiple pins and is coupled to multiple pins of the second external signal port of the SD memory card device. The driving circuit is coupled to the first external signal port. The processor is coupled to the driving circuit and used for: controlling the driving circuit to send a first power signal corresponding to the SD mode from the electronic device to the SD memory card device via the first external signal port and a pin VDD1 Of the second external signal port, to control and make the SD memory card device enter an initial state; and sending a second power signal from the electronic device to the SD memory card device via one of a pin VDD2 and a pin VDD3 of the second external signal port, to control and make the SD memory card device enter a Linkup state of a PCIe mode, a voltage level of the second power signal being lower than a voltage level of the first power signal. A plurality of pins, used for a data line, of an UHS-I input/output communication interface standard employed by the SD mode of the SD memory card device are shared by another input/output communication interface standard of a PCIe channel with an NVMe protocol employed by the PCIe mode, and the plurality of pins of the UHS-I input/output communication interface standard employed by the SD mode comprise pins of pin numbers 1, 7, 8, and 9.

According to an embodiment, a method for controlling a data transmission mode of an SD memory card device is disclosed. The electronic is used as a host and has a first external signal port. The SD memory card device at least one operates an SD mode and has a second external signal port, and the SD memory card device is coupled to the electronic device via the first external signal port and the second external signal port. The method comprises: sending a first power signal corresponding to the SD mode from the electronic device used as the host to the SD memory card device via the first external signal port and a pin VDD1 of the second external signal port, to control and make the SD memory card device enter an initial state; sending a command CMD0 corresponding to the SD mode from the electronic device to the SD memory card device via pin CMD employed by the SD mode or sending a specific clock SDCLK corresponding to the SD mode from the electronic device to the SD memory card device via pin CLK employed by the SD mode, to control and make the SD memory card device enter the SD mode from the initial state and operate under the SD mode; sending a command CMD8 from the electronic device to the SD memory card device via the pin CMD to query whether the SD memory card device supports a PCIe mode; controlling the SD memory card device to operate under the SD mode if the SD memory card device responses that the PCIe mode is not supported; and sending a second power signal from the electronic device to the SD memory card device via one of a pin VDD2 and a pin VDD3 of the second external signal port if the SD memory card device responses that the PCIe mode is supported, to control and make the SD memory card device enter a Linkup state of the PCIe mode, a voltage level of the second power signal being lower than a voltage level of the first power signal. A plurality of pins of an UHS-I input/output communication interface standard employed by the SD mode of the SD memory card device, used for a data line, are shared to be used by another input/output communication interface standard of PCIe channel with NVMe protocol employed by the PCIe mode; the plurality of pins used as the data line in the SD mode comprise pins of pin numbers 1, 7, 8, and 9.

According to an embodiment, an electronic device to be coupled to an SD memory card device and capable of controlling a data transmission mode of the SD memory card device is disclosed. The electronic device is at a host and has a first external signal port. The SD memory card device at least can operate under an SD mode and have a second external signal port. The electronic device comprises the first external signal port, a driving circuit, and a processor. The first external signal port has a plurality of pins to be coupled to multiple pins of the second external signal port of the SD memory card device. The driving circuit is coupled to the first external signal port. The processor is coupled to the driving circuit and configured for: controlling the driving circuit to send a first power signal corresponding to the SD mode from the electronic device to the SD memory card device through the first external signal port and a pin VDD1 of the second external signal port, to control and make the SD memory card device enter an initial state; controlling the driving circuit to send a command CMD0 corresponding to the SD mode from the electronic device to the SD memory card device through the pin CMD employed by the SD mode or to send a specific clock SDCLK corresponding to the SD mode from the electronic device to the SD memory card device through a pin CLK employed by the SD mode, to control and make the SD memory card device enter the SD mode from the initial state and operate under the SD mode; controlling the driving circuit to send a command CMD8 from the electronic device to the SD memory card device through the pin CMD to query whether the SD memory card device supports a PCIe mode; controlling the SD memory card device to operate under the SD mode if the SD memory card device responses that the PCIe mode is not supported; and sending a second power signal from the electronic device to the SD memory card device via one of a pin VDD2 and a pin VDD3 of the second external signal port if the SD memory card device responses that the PCIe mode is supported, to control and make the SD memory card device enter a Linkup state of the PCIe mode, a voltage level of the second power signal being lower than a voltage level of the first power signal. A plurality of pins of an UHS-I input/output communication interface standard employed by the SD mode of the SD memory card device, used for a data line, are shared to be used by another input/output communication interface standard of PCIe channel with NVMe protocol employed by the PCIe mode; the plurality of pins used as the data line in the SD mode comprise pins of pin numbers 1, 7, 8, and 9.

According to an embodiment, a method used in an SD memory card device is disclosed. An electronic device used as a host has a first external signal port. The SD memory card device can at least operate under an SD mode and have a second external signal port, and the SD memory card device is coupled to the electronic device through the first external signal port and the second external signal port. The method comprises: receiving a first power signal corresponding to the SD mode from the electronic device through the first external signal port and a pin VDD1 of the second external signal port, to control and make the SD memory card device enter an initial state; and receiving a second power signal from the electronic device through one among a pin VDD2 and a pin VDD3 of the second external signal port, a voltage level of the second power signal being lower than a voltage level of the first power signal. A plurality of pins of an UHS-I input/output communication interface standard employed by the SD mode of the SD memory card device, used for a data line, are shared to be used by another input/output communication interface standard of PCIe channel with NVMe protocol employed by the PCIe mode; the plurality of pins used as the data line in the SD mode comprise pins of pin numbers 1, 7, 8, and 9.

According to an embodiment, a flash memory controller of an SD memory card device is disclosed. The SD memory card device is coupled to an electronic device, and the electronic device is at a host and has a first external signal port. The SD memory card device at least can operate under an SD mode and have a second external signal port. The second external signal port has multiple pins to be coupled multiple pins of the first external signal port of the electronic device. The SD memory card device further comprises a flash memory, and the flash memory controller is coupled between the flash memory and the second external signal port. The flash memory controller comprises a register and a processing circuit. The register is configured for temporarily storing information of the flash memory. The processing circuit is coupled to the register and configured for: receiving a first power signal, corresponding to the SD mode, sent from the electronic device through the first external signal port and a pin VDD1 of the second external signal port, to control and make the SD memory card device enter an initial state; and receiving a second power signal sent from the electronic device through one among a pin VDD2 and a pin VDD3 of the second external signal port, to control and make the SD memory card device enter a Linkup state of a PCIe mode, a voltage level of the second power signal being lower than a voltage level of the first power signal. A plurality of pins, used for a data line, of an UHS-I input/output communication interface standard employed by the SD mode of the SD memory card device are shared to be used by another input/output communication interface standard of a PCIe channel with an NVMe protocol employed by the PCIe mode; the plurality of pins used as the data line in the SD mode comprise pins of pin numbers 1, 7, 8, and 9.

According to an embodiment, a method used in an SD memory card device is disclosed. An electronic device used as a host has a first external signal port. The SD memory card device at least can operate under an SD mode and have a second external signal port, and the SD memory card device is coupled to the electronic device through the first external signal port and the second external signal port. The method comprises: receiving a first power signal, corresponding to the SD mode, sent from the electronic device through the first external signal port and a pin VDD1 of the second external signal port, to make the SD memory card device enter an initial state; receiving a command CMD0, corresponding to the SD mode, sent from a pin CMD employed by the SD mode from the electronic device or a specific clock SDCLK, corresponding to the SD mode, sent from a pin CLK employed by the SD mode from the electronic device, to make the SD memory card device enter the SD mode from the initial state and operate under the SD mode; receiving a command CMD8 sent from the electronic device through the pin CMD wherein the command CMD8 is used to query whether the SD memory card device supports a PCIe mode; responding the electronic device that the SD memory card device does not support the PCIe mode and maintain at the SD mode if the PCIe mode is not supported; and responding the electronic device that the SD memory card device supports the PCIe mode if the PCIe mode is supported, and then receiving a second power signal sent from the electronic device through one among a pin VDD2 and a pin VDD3 of the second external signal port, to make the SD memory card device enter a Linkup state of the PCIe mode, a voltage level of the second power signal being lower than a voltage level of the first power signal. A plurality of pins, used for a data line, of an UHS-I input/output communication interface standard employed by the SD mode of the SD memory card device are shared to be used by another input/output communication interface standard of a PCIe channel with an NVMe protocol employed by the PCIe mode; the plurality of pins used as the data line in the SD mode comprise pins of pin numbers 1, 7, 8, and 9.

According to an embodiment, a flash memory controller of an SD memory card device is disclosed. The SD memory card device is coupled to an electronic device. The electronic device is at a host and has a first external signal port. The SD memory card device at least can operate under an SD mode and have a second external signal port, and the second external signal port has multiple pins to be coupled to multiple pins of the first external signal port of the electronic device. The SD memory card device further has a flash memory, and the flash memory controller is coupled between the flash memory and the second external signal port. The flash memory controller comprises a register and a processing circuit. The register is used for temporarily storing information of the flash memory. The processing circuit is coupled to the register and used for: receiving a first power signal, corresponding to the SD mode, sent from the first external signal port and a pin VDD1 of the second external signal port from the electronic device, to control and make the SD memory card device enter an initial state; receiving a command CMD0, corresponding to the SD mode, through the pin CMD employed by the SD mode sent from the electronic device or a specific clock SDCLK, corresponding to the SD mode, through a pin CLK employed by the SD mode sent from the electronic device, to control and make the SD memory card device enter the SD mode from the initial state and operated under the SD mode; receiving a command CMD8 through the pin CMD sent from the electronic device, the command CMD8 being used for querying whether the SD memory card device supports a PCIe mode; using the processing circuit to respond the electronic device that the secure digital memory card device does not support the PCIe mode and maintaining the SD memory card device at the SD mode if the SD memory card device does not support the PCIe mode; and using the processing circuit to respond the electronic device that the SD memory card device supports the PCIe mode and then receiving a second power signal through one among a pin VDD2 and a pin VDD3 of the second external signal port sent from the electronic device if the SD memory card device supports the PCIe mode, to control and make the SD memory card device enter a Linkup state of the PCIe mode, a voltage level of the second power signal being lower than a voltage level of the first power signal. A plurality of pins, used for a data line, of an UHS-I input/output communication interface standard employed by the SD mode of the SD memory card device are shared to be used by another input/output communication interface standard of a PCIe channel with an NVMe protocol employed by the PCIe mode, and the plurality of pins of the UHS-I input/output communication interface standard employed by the SD mode comprise pins of pin numbers 1, 7, 8, and 9.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a mechanism of a memory card device having different data transmission modes. The different data transmission modes for example can be a secure digital (SD) mode supporting the data transmission of an SD memory card and a PCIe (Peripheral Component Interconnect Express) mode supporting the data transmission of a PCIe channel with a NVMe protocol (NVM Express protocol), i e. the PCIe mode is implemented by employing the physical layer of PCIe channel interface on which the NVMe protocol runs and thus can also be called the PCIe/NVMe mode. The different data transmission modes share and use at least one signal pin of an external communication signal port of the memory card device. In addition, the provided mechanism of the invention can protect and prevent the memory card device from circuit damage caused due to that actual voltage of the signal level becomes different when the memory card device switches between the different data transmission modes, and/or to make the data transmission between the memory card device and an electronic device which is used as a host adopt a data transmission mode with a faster data rate so as to improve the transmission rate.

Conventional SD memory card devices produced by a manufacturer and sold on the market generally have a fewer pins. For example, a conventional SD memory card device may have signal pins of only one row and support one data transmission mode such as SD mode; the conventional SD memory card device perform data communication with an electronic device as a host through an UHS-I input/output communication interface standard specified by the SD mode.

The invention provides a novel memory card device having different data transmission modes and having more pins. For example, the novel memory card device may have signal pins of a first row and signal pins of a second row, and supports different data transmission interfaces such as the UHS-I input/output communication interface standard specified by the SD mode and the PCIe mode supporting the PCIe channel interface with the NVMe protocol. The provided memory card device can perform data communication with the electronic device as the host through the specified different communication standards. In addition, for the electronic device used as the host, its driving circuits and/or version information of driver programs may be classified into the driving circuit and/or driver programs which can support a fewer signal pins and only SD mode and the driving circuit and/or driver programs which can support the more signal pins and additional PCIe mode.

It should be noted that the values of actually specified voltage levels of the signal logic levels of input/output communication interface standards respectively employed by the SD mode and PCIe mode for performing data transmission are different. In some situations, the circuits of the memory card device may be damaged due to the different specified voltage levels of the signal logic levels of input/output communication interface standards.

Thus, in order to avoid the circuit damage as well as to more rapidly control the memory card device entering a data transmission mode capable of supporting a higher data transmission speed, a novel method for controlling a memory card device to switch between SD mode and PCIe mode is provided in the embodiments of the invention.

In the embodiments of the invention, the memory card device for example is an SD memory card device (but not limited). The memory card disclosed in the invention has more pins which are arranged in two rows and can support both SD mode and PCIe mode. The memory card device can operate under either SD mode or PCIe mode. The memory card device respectively operating under the SD mode and PCIe mode shares and uses at least one pin of an external communication port of the memory card device to perform communication with an electronic device used as a host. The first table in the following lists the pin numbers, names, types, descriptions of the pins employed by the SD mode, and the second table lists the pin numbers, names, types, descriptions of the pins employed by the PCIe mode:

| Pin Number | SD mode | | |
|---|---|---|---|
| | Name | Type | Description |
| 1 | CD/DAT3 | I/O/PP | Card detect/Data line 3[bit 3] |
| 2 | CMD | I/O/PP | Command/Response |
| 3 | VSS1 | S | Ground |
| 4 | VDD | S | Supply voltage |
| 5 | CLK | I | Clock |
| 6 | VSS2 | S | Ground |
| 7 | DAT0 | I/O/PP | Data line 0[bit 0] |
| 8 | DAT1 | I/O/PP | Data line 1[bit 1] |
| 9 | DAT2 | I/O/PP | Data line 2[bit 2] | wherein S means the supply voltage, I means the input, O means the output of push-pull driving, and PP means input/output of push-pull driving. The above-mentioned commands are transmitted through the pin CMD, and data to be transmitted is sent via the pins DAT0, DAT1, DAT2, and CD/DAT3.

| Pin Number | PCIe mode | | |
|---|---|---|---|
| | Name | Type | Description |
| 1 | PERST# | Input signal (active low) | PE-Reset is a function reset to the card as defined by the PCIe Mini CEM specification |
| 4 | VDD1 | Supply voltage | 2.7 V to 3.6 V |
| 7 | REFCLK+ | Differential Signaling: Input | Clock Input |
| 8 | REFCLK− | Differential Signaling: Input | Clock Input |
| 9 | CLKREQ# | I/O (active low, open drain) | Reference clock request signal. Also used by L1 PM substates |
| 10 | VSS3 | Ground | |
| 11 | PCIe TX+ | Differential Signaling | Card Input |
| 12 | PCIe TX− | Differential Signaling | Card Input |
| 13 | VSS4 | Ground | |
| 14 | VDD2 | Supply Voltage 2 | 1.70 V to 1.95 V |
| 15 | PCIe RX− | Differential Signaling | Card Output |
| 16 | PCIe RX+ | Differential Signaling | Card Output |
| 17 | VSS5 | Ground | |
| 18* | VDD3 | Supply Voltage 3 | 1.14 V to 1.30 V | wherein the symbol '*' means that the pin is reserved for the supply voltage 3. The pins having pin numbers 1, 7, 8, and 9 (but not limited) are shared and respectively used by the operations of the SD mode and PCIe mode for the memory card device. It should be noted that the above-mentioned examples are not meant to be a limitation of the invention. The method and flowchart provided in one embodiment of the invention is for example applied into a driving circuit of an electronic device used as a host wherein such driving circuit is used for controlling a memory card device entering to operate under the SD mode or PCIe mode so as to avoid circuit damage as well as improve data transmission efficiency.

Figure 1:
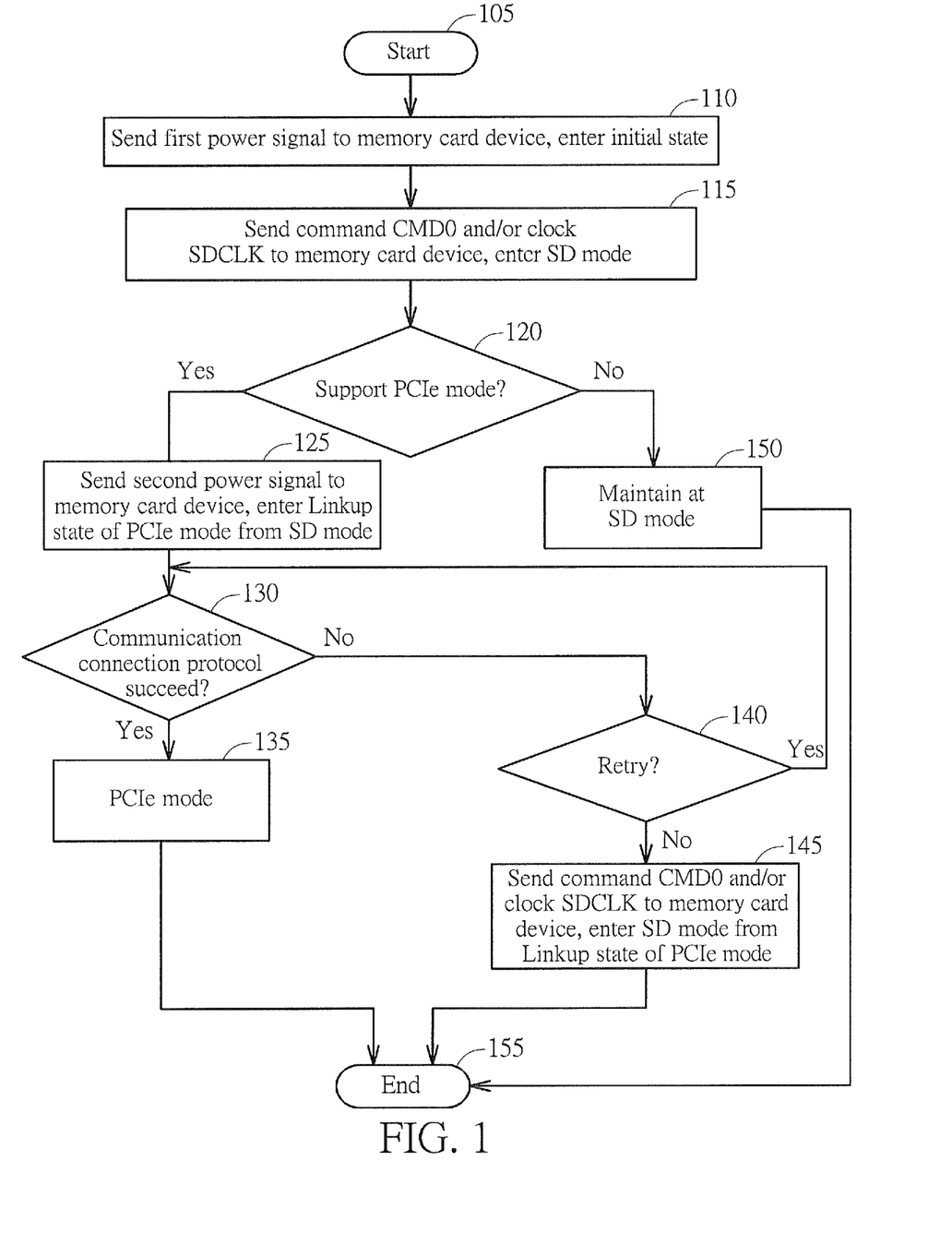
FIG. 1 is a flowchart diagram of a method for controlling the data transmission mode of a memory card device according to a first embodiment of the invention.

Please refer to FIG. 1. FIG. 1 is a flowchart diagram of a method for controlling the data transmission mode of a memory card device according to a first embodiment of the invention. Provided that substantially the same result is achieved, the steps of the flowchart shown in FIG. 1 need not be in the exact order shown and need not be contiguous, that is, other steps can be intermediate. Steps are detailed in the following:

Step 105: Start;

Step 110: An electronic device as a host sends a first power signal from a driving circuit of the electronic device to the memory card device through a pin VDD1, to control and make the memory card device enter an initial state which is a pseudo initial state;

Step 115: Send a specific command such as command CMD0, corresponding to the SD mode, from the driving circuit of the electronic device to the memory card device through a pin CMD and/or send a specific clock SDCLK, corresponding to the SD mode, from the driving circuit of the electronic device to the memory card device through a pin CLK, to control and make the memory card device enter the SD mode from the initial state and operate under the SD mode;

Step 120: Send a command CMD8 from the driving circuit of the electronic device to the memory card device through the pin CMD to query whether the memory card device supports the PCIe mode and to wait for a response/reply of the memory card device; if the memory card device replies that it supports the PCIe mode, then the flow proceeds to Step 125; otherwise, if the memory card device replies that it does not support the PCIe mode, then the flow proceeds to Step 150;

Step 125: Send or enable a second power signal, corresponding to the PCIe mode, from the driving circuit of the electronic device as the host to the memory card device through the pin VDD2 or pin VDD3, to control and make the memory card device enter a Linkup state of the PCIe mode from the SD mode;

Step 130: The memory card device in the Linkup state of the PCIe mode communicates with the electronic device as the host based on a communication connection protocol and the electronic device determines whether the communication connection protocol succeeds; if the communication connection protocol succeeds, then the flow proceeds to Step 135; otherwise, if the communication connection protocol fails, then the flow proceeds to Step 140;

Step 135: The electronic device controls the memory card device operate under the PCIe mode;

Step 140: The electronic device determines whether to retry a connection; if determining to retry a connection, then the flow proceeds to Step 130; otherwise, if determining not to retry a connection, then the flow proceeds to Step 145;

Step 145: Send the command CMD0, corresponding to the SD mode, from the driving circuit of the electronic device to the memory card device through the pin CMD and/or send the specific clock SDCLK, corresponding to the SD mode, from the driving circuit of the electronic device to the memory card device through the pin CLK, to control and make the memory card device enter the SD mode from the Linkup state of the PCIe mode and operate under the SD mode;

Step 150: Maintain at the SD mode; and

Step 155: End.

Figure 2:
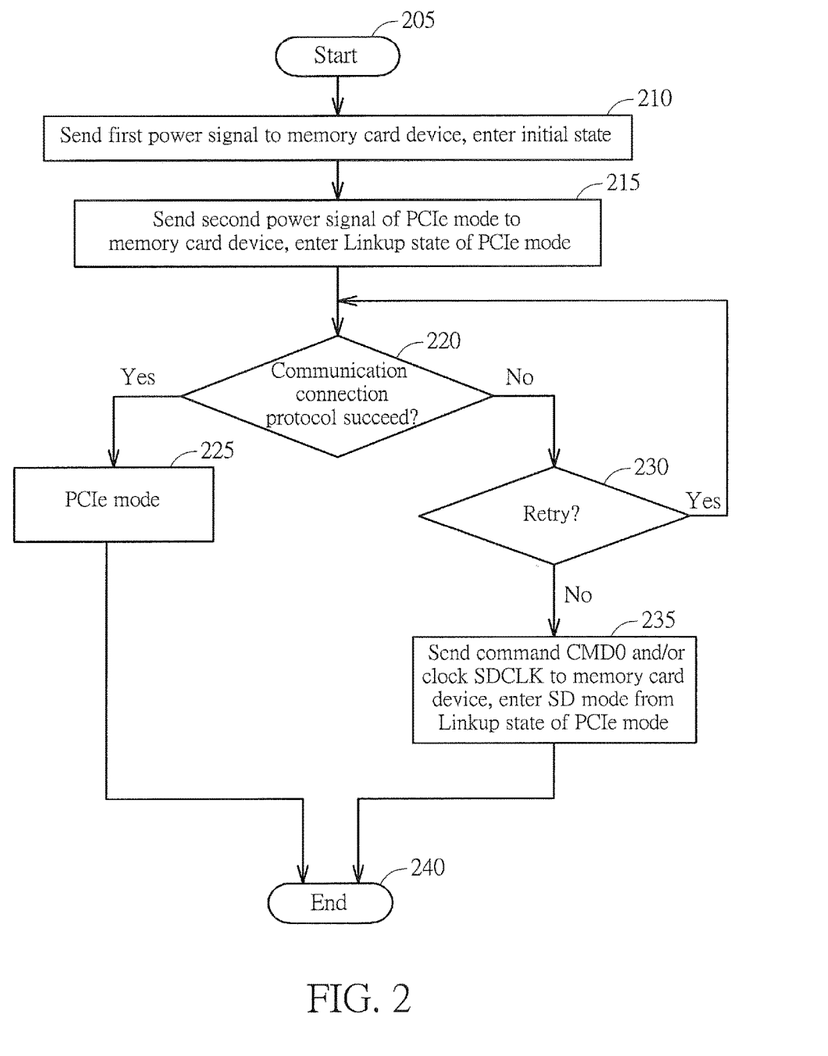
FIG. 2 is a flowchart diagram of a method for controlling a data transmission mode of a memory card device according to a second embodiment of the invention.

Further, in one embodiment, the electronic device as the host can determine not to control the memory card device entering the SD mode and instead determine to send the second power signal to the memory card device through the pin VDD2 or pin VDD3 to try to control the memory card device entering the PCIe mode at first. Please refer to FIG. 2. FIG. 2 is a flowchart diagram of a method for controlling a data transmission mode of a memory card device according to a second embodiment of the invention. Provided that substantially the same result is achieved, the steps of the flowchart shown in FIG. 2 need not be in the exact order shown and need not be contiguous, that is, other steps can be intermediate. Steps are detailed in the following:

Step 205: Start;

Step 210: The electronic device as the host sends the first power signal from the driving circuit of the electronic device to the memory card device through the pin VDD1, to control and make the memory card device enter the pseudo initial state;

Step 215: Send or enable the second power signal, corresponding to the PCIe mode, from the driving circuit of the electronic device as the host to the memory card device through the pin VDD2 or pin VDD3, to control and make the memory card device enter the Linkup state of the PCIe mode form the SD mode;

Step 220: In the Linkup state of the PCIe mode the memory card device communicates with the electronic device at the host based on the communication connection protocol and the electronic device determines whether the communication connection protocol succeeds; if the communication connection protocol succeeds, then the flow proceeds to Step 225; otherwise, if the communication connection protocol fails, then the flow proceeds to Step 230;

Step 225: The electronic device controls the memory card device operate under the PCIe mode;

Step 230: The electronic device determines whether to retry a connection; if determining to retry a connection, then the flow proceeds to Step 220; otherwise, if determining not to retry a connection, then the flow proceeds to Step 235;

Step 235: Send the command CMD0, corresponding to the SD mode, from the driving circuit of the electronic device to the memory card device through the pin CMD and/or send the specific clock SDCLK, corresponding to the SD mode, from the driving circuit of the electronic device to the memory card device through the pin CLK, to control and make the memory card device enter the SD mode from the Linkup state of the PCIe mode and operate under the SD mode; and Step 240: End.

Figure 3:
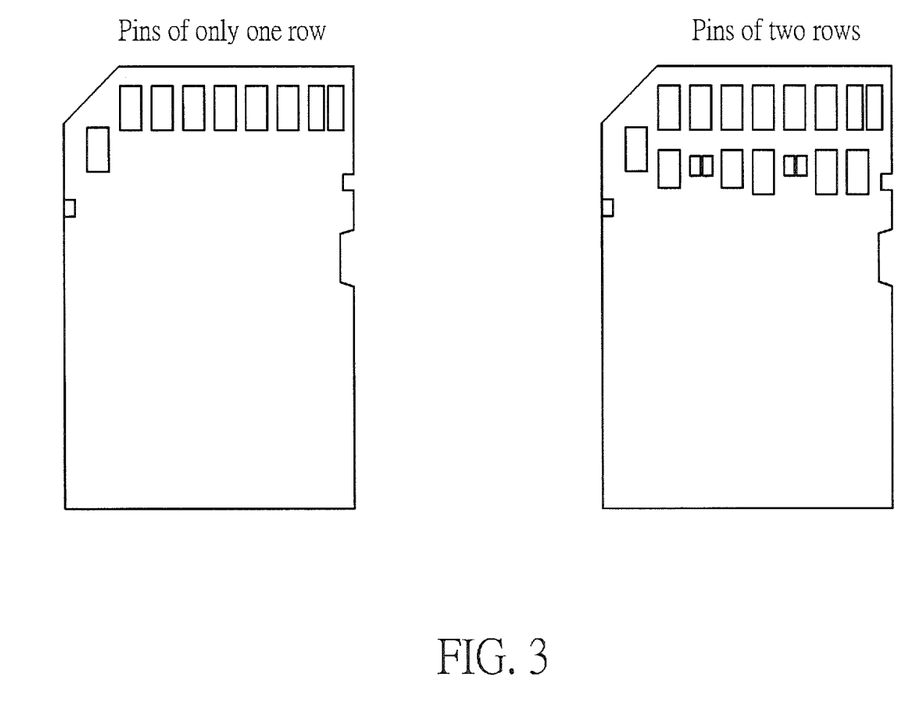
FIG. 3 is a diagram showing two memory card devices respectively having different numbers of pins.

FIG. 3 is a diagram showing two memory card devices respectively having different numbers of pins. For example, the memory card device shown on the left side of FIG. 3 has nine pins of only a single row and for example is an SD memory card supporting the first generation UHS (UHS-I) data transmission interface. The memory card device disclosed by the embodiments is the memory card device shown on the right side of FIG. 3 having eighteen pins totally arranged in two rows, and it for example is an SD memory card supporting the UHS-I input/output communication interface standard specified in the SD mode as well as supporting the PCIe channel interface with NVMe protocol specified in the PCIe mode.

Figure 4:
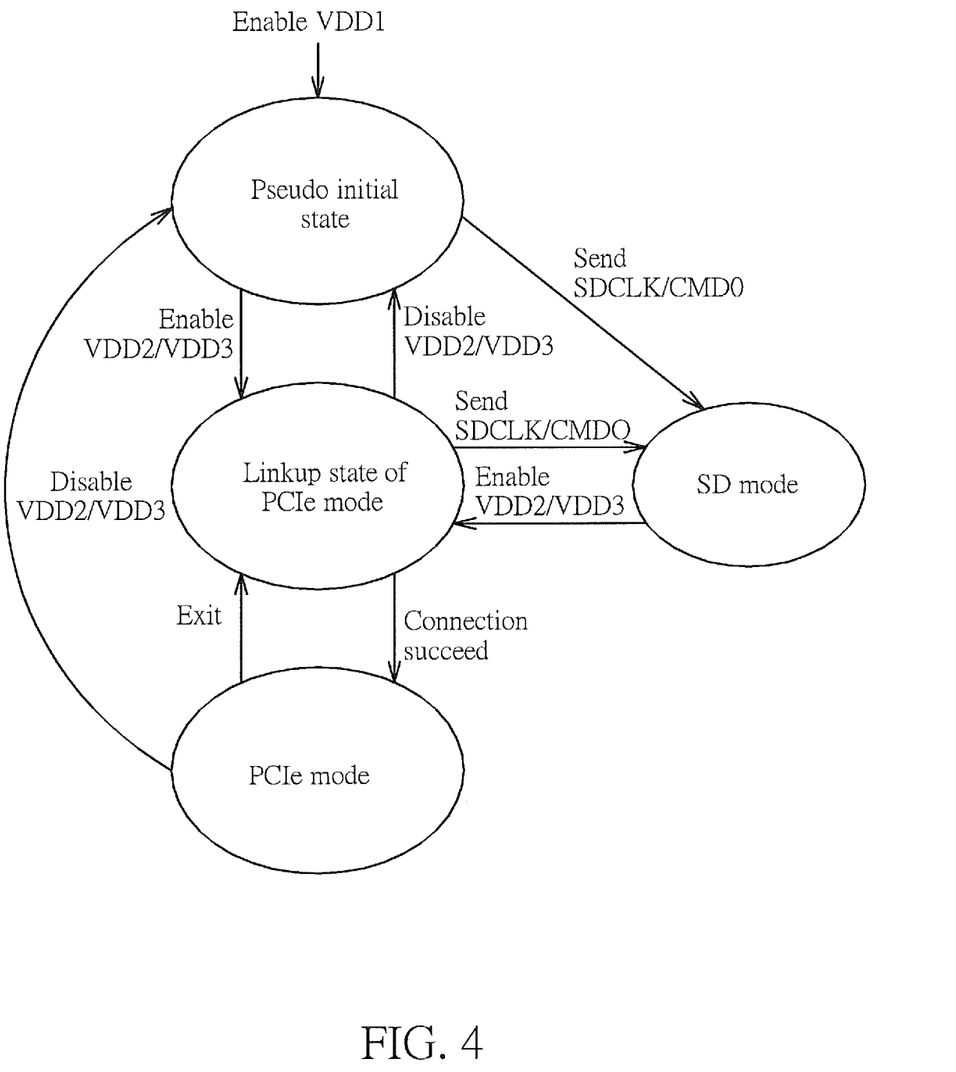
FIG. 4 is state switching diagram of the data transmission mode of a memory card device according to an embodiment of the invention.

Please refer to FIG. 4. FIG. 4 is state switching diagram of the data transmission mode of a memory card device according to an embodiment of the invention. In this embodiment, the memory card device is a memory card device supporting both the SD mode and PCIe mode. That is, the SD mode means a first mode having a data transmission rate lower than a maximum data transmission rate of a second mode such as PCIe mode. The first power signal at the pin VDD1 is for example equal to 3.3 Volts different from the second power signal, e.g. 1.2 volts at pin VDD3 or 1.8 Volts at pin VDD2. However, this is not meant to be a limitation. For the SD memory card device supporting both the SD mode and PCIe mode, as shown in the flowcharts of FIG. 1 and FIG. 2, the electronic device as the host can control the SD memory card device operate under the SD mode at first and then try to control and make it enter the PCIe mode. Alternatively, the electronic device as the host can directly control the SD memory card device trying to enter the PCIe mode, and control the SD memory card device entering the SD mode if the SD memory card device cannot enter the PCIe mode.

For the initialization of the SD memory card device, the electronic device as the host is used to send the first power signal such as 3.3 Volts to the SD memory card device through the pin VDD1 of the external signal port, and thus the SD memory card device then enters the pseudo initial state.

In the pseudo initial state, as indicated by the flowchart of FIG. 1, the electronic device can send the specific command CMD0 corresponding to the SD mode or the specific clock SDCLK corresponding to the SD mode to the SD memory card device, to control the SD memory card device entering the SD mode from the initial state. Alternatively, as shown by the flowchart of FIG. 2, the electronic device can send or enable the second power signal such as 1.8 Volts or 1.2 Volts corresponding to the PCIe mode from the electronic device to the SD memory card device through the pin VDD2 or pin VDD3, to control the SD memory card device directly entering the Linkup state of the PCIe mode from the initial state.

When the SD memory card device operates under the SD mode, the electronic device can control the SD memory card device trying to enter the PCIe mode by sending or enabling the second power signal corresponding to the PCIe mode from the electronic device to the SD memory card device through the pin VDD2 or pin VDD3, to control and make the SD memory card device enter the Linkup state of the PCIe mode from the SD mode.

When the SD memory card device is in the Linkup state of the PCIe mode, the electronic device can control the SD memory card device entering the SD mode by sending the specific command CMD0 corresponding to the SD mode or the specific clock SDCLK corresponding to the SD mode to the SD memory card device, to control and make the SD memory card device enter the SD mode from the Linkup state of the PCIe mode. The Linkup state of the PCIe mode means a state of waiting for a connection result of the communication connection protocol before the SD memory card device enters the PCIe mode. Thus, even though an SD memory card device does not support the PCIe mode, it is possible that the SD memory card device may enter the state of waiting for the connection result. Accordingly, if the connection result is fail (i.e. the communication connection protocol fails), then the electronic device sends the specific command CMD0 corresponding to the SD mode or the specific clock SDCLK corresponding to the SD mode to the SD memory card device to control the SD memory card device entering the SD mode from the state of waiting for the connection result. When the connection result is pass (i.e. the communication connection protocol succeeds), then the electronic device controls the SD memory card device entering the PCIe mode from the Linkup state of PCIe mode.

When operating under the PCIe mode, the SD memory card device can exit the PCIe mode and go back to the Linkup state of PCIe mode. Alternatively, the electronic device can control and make the SD memory card device go back to the pseudo initial state from the PCIe mode by disabling the second power signal, corresponding to the PCIe mode, at the pin VDD2 or pin VDD3.

For example, when the SD memory card device operates under the PCIe mode, a communication bottom layer between the SD memory card device and the electronic device as the host is arranged to record a register Linkup parameter which can be temporarily stored within the electronic device. For example, the register Linkup parameter stored in a corresponding driving circuit of the electronic device (but not limited). When the connection result of the SD memory card device operating under the PCIe mode becomes fail, the register Linkup parameter becomes zero, and the SD memory card device exits the PCIe mode and goes back to the Linkup state of the PCIe mode. In this situation, the electronic device controls the SD memory card device retry the connection again. The times of trying re-connection depends on the design of the electronic device; this is not meant to be a limitation. To perform the above mentioned operations, the electronic device can dynamically control the SD memory card device to switch between different modes in response to different requirements of system performances. It is not necessary for the SD memory card device to have to operate under the mode having a faster data transmission rate.

When the SD memory card device is at the Linkup state of PCIe mode, the electronic device can control the SD memory card device entering the pseudo initial state by disabling the second power signal at the pin VDD2 or pin VDD3.

Figure 5:
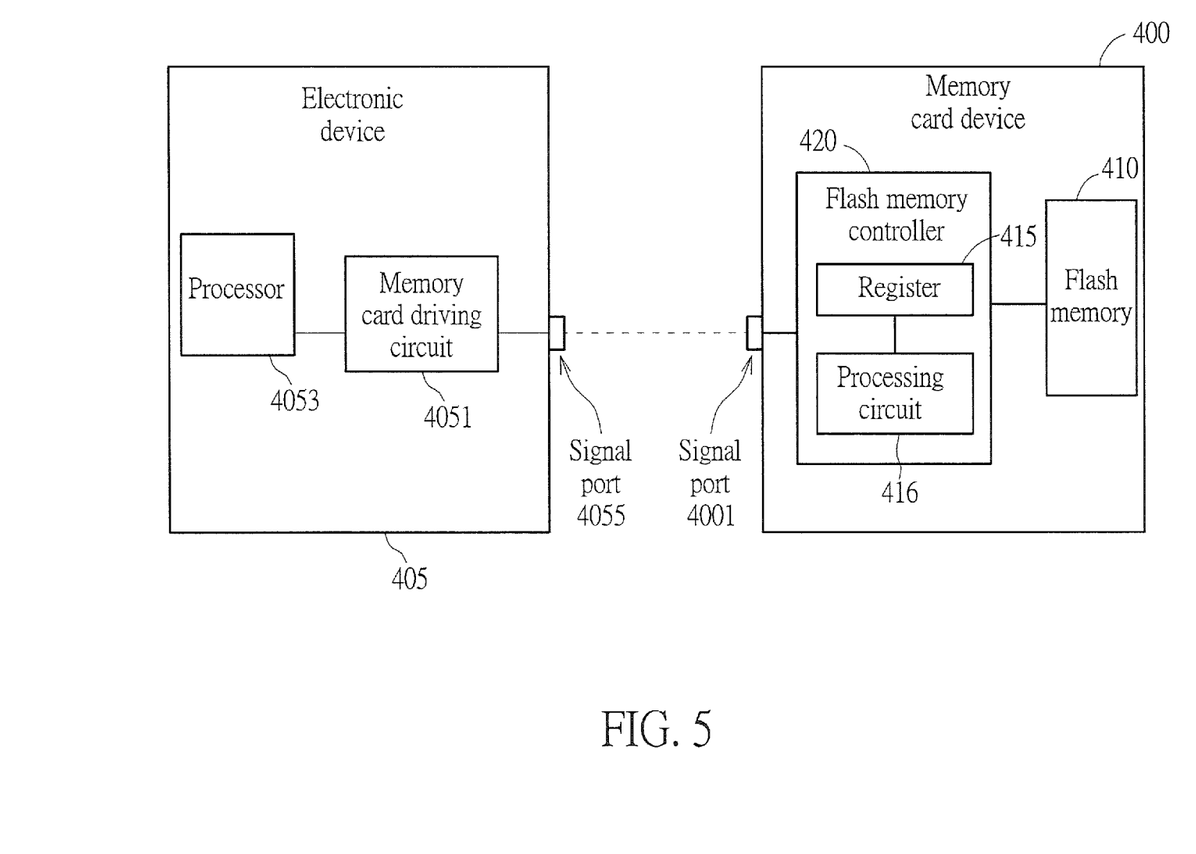
FIG. 5 is a block diagram of implementations of the memory card device (e.g. an SD memory card device) and the electronic device as the host according to the method disclosed in the embodiments of the invention.

Please refer to FIG. 5. FIG. 5 is a block diagram of implementations of the memory card device 400 (e.g. an SD memory card device) and the electronic device 405 as the host according to the method disclosed in the embodiments of the invention. The memory card device 400 comprises an external signal port 4001, the flash memory 410, and the flash memory controller 420. The controller 420 is coupled between the external signal port 4001 and flash memory 410, and is connected to the flash memory 410 through an internal bus. The flash memory controller 420 comprises a register 415 and a processing circuit 416. The register 415 can be used to temporarily store basic data of the flash memory 410. The processing circuit 416 is used to execute corresponding operations of the flash memory controller 420, e.g. data/signal reception and transmission of above-mentioned input/output interface, access, computation, and so on. The flash memory 410 comprises one or more flash memory chips. The electronic device 405 comprises the external signal port 4055, memory card driving circuit 4051, and processor 4053. The electronic device 405 is coupled to the memory card device 400 through the signal ports 4055 and 4001 which respectively comprise multiple corresponding pins. The memory card device 400 at least can operate under the SD mode. The processor 4053 is used for controlling the driving circuit 4051 to send the first power signal, corresponding to the SD mode, to the memory card device 400 through the external signal port 4055 and the pin VDD1 of external signal port 4001. When the controller 420 detects the first power signal at the pin VDD1, the controller 420 accordingly controls the memory card device 400 entering the initial state. In addition, the memory card device 400 can further operate under the PCIe mode. A portion of pins of the external signal port 4001, e.g. the pins having pin numbers 1, 7, 8, and 9, are shared and used by the operations of memory card device 400 respectively operating under the both SD mode and PCIe mode.

In addition, the processor 4053 controls the driving circuit 4051 to send the second power signal, corresponding to the PCIe mode, from the electronic device 405 to the memory card device 400 through the pin VDD2 or to send the second power signal, corresponding to the PCIe mode, from the electronic device 405 to the memory card device 400 through the pin VDD3. The controller 420 is arranged to detect the second power signal at the pin VDD2 or pin VDD3. For example, when detecting that the second power signal is at the pin VDD3, the controller 420 can accordingly control and make the memory card device 400 enter the Linkup state of PCIe mode from the initial state. In the Linkup state of PCIe mode, the processor 4053 communicates with the controller 420 of memory card device 400 based on a communication connection protocol through the driving circuit 4051, the external signal port 4055, and the external signal port 4001. If the communication connection protocol succeeds, then the memory card device 400 operates under the PCIe mode. If the communication connection protocol fails, then the driving circuit 4051 can determine whether to retry a connection. If determining not to retry a connection, then the memory card device 400 is controlled to enter the SD mode from the Linkup state.

In addition, in the Linkup state of PCIe mode, the processor 4053 can also control the driving circuit 4051 to disable the second power signal of PCIe mode sent at the pin VDD2 or pin VDD3 through the driving circuit 4051, external signal port 4055, and external signal port 4001, to accordingly control and make the memory card device 400 go back to the initial state from the Linkup state of PCIe mode.

In addition, the processor 4053 can control the driving circuit 4051 to send at least one of the specific command such as CMD0 corresponding to the SD mode and the specific clock SDCLK corresponding the SD mode from the electronic device 405 to the control 420 of the memory card device 400 through the driving circuit 4051, external signal port 4055, and external signal port 4001, to accordingly control and make the memory card device 400 enter the SD mode from the initial state.

Figure 6:
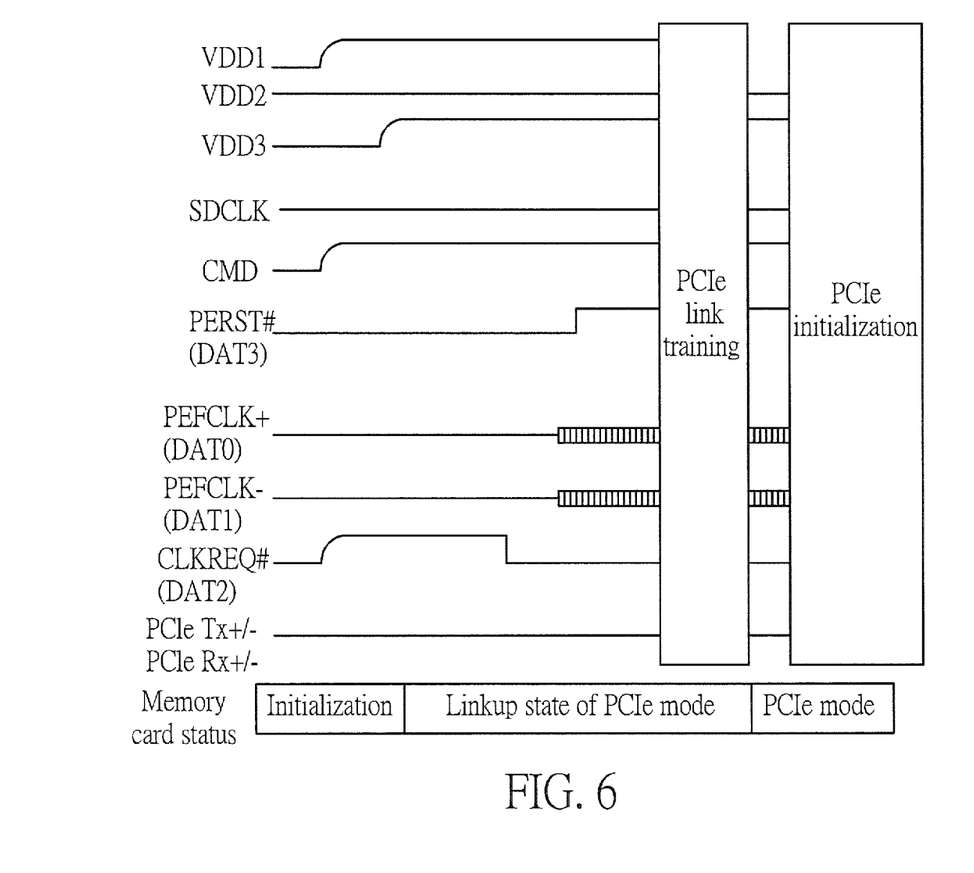
FIG. 6 is a diagram of examples of signals at a portion of pins when the electronic device as a host and shown on FIG. 5 directly controls the memory card device entering the PCIe mode from the initial state.

FIG. 6 is a diagram of examples of signals at a portion of pins when the electronic device 405 as a host and shown on FIG. 5 directly controls the memory card device 400 entering the PCIe mode from the initial state. As shown in FIG. 6, the electronic device 405 as the host at first is arranged to raise a low voltage level at the pin CMD, e.g. 0 Volts, to a high voltage level such as 3.3 Volts or 1.8 Volts, and also to raise the level at the pin CLKREQ# from 0 Volts to 3.3 Volts or 1.8 Volts and raise the level at the pin VDD1 from a low voltage level such as 0 Volts to a high voltage level such as 3.3 Volts to provide the first power signal to the memory card device 400 to control the memory card device 400 entering the initial state.

In this embodiment, the electronic device 405 determines to directly control the memory card device 400 trying to enter the PCIe mode, and thus in the initial state is arranged to directly provide the second power signal to raise the level at the pin VDD3 from a low voltage level, e.g. 0 Volts, to a high voltage level such as 1.2 Volts. It should be noted that the electronic device 405 can raise the level at the pin VDD2 from the low voltage level, e.g. 0 Volts, to the high voltage level such as 1.8 Volts so as to provide the second power signal. This depends on the design of the electronic device 405 and whether the memory card device 400 supports the pin VDD3. If the memory card device 400 does not support the pin VDD3, then the electronic device 405 can try to raise the level at the pin VDD2 from the low voltage level, e.g. 0 Volts, to the high voltage level such as 1.8 Volts or try to directly control the memory card device 400 entering the SD mode.

Accordingly, in the embodiment of FIG. 6, when the memory card device 400 detects that the level at the pin VDD3 is raised from 0 Volts to 1.2 Volts, the memory card device 400 can enter the Linkup state of PCIe mode. In the Linkup state of PCIe mode, the memory card device 400 reduces the level at the pin CLKREQ# from 3.3 Volts or 1.8 Volts to 0 Volts, to notify the electronic device 405 of that the memory card device 400 has received a connection request of PCIe mode and has been ready to receive the clock input signal provided by the electronic device 405. The electronic device 405 as the host is arranged to wait for at most 1 ms to detect whether the level at the pin CLKREQ# is reduced from the high voltage level to the low voltage level. If the level is reduced to the low voltage level, then the electronic device 405 starts to transmit differential clock input signals, e.g. the waveforms having levels in the range from 0.8 Volts to 1.2 Volts, through the pins REFCLK− and REFCLK+ to the memory card device 400 and to determine whether it is able to stably provide the differential clock input signals for example at least 100 microseconds. If it is able to stably provide the differential clock input signals, then the electronic device 405 raises the level at the pin PERST# from the low voltage level such as 0 Volts to the high voltage level such as 3.3 Volts or 1.8 Volts and then starts link training of PCIe mode. After the link training has been completed, the memory card device 400 can operate under the PCIe mode and perform the initialization of PCIe mode.

If the operation in the Linkup state of PCIe mode is fail, then the memory card device 400 enters the SD mode and the electronic device 405 is arranged to access the memory card device 4090 through the UHS-I data transmission interface under the SD mode. The operation which is fail may be generated due to that the level at pin CLKREQ# is always at the high voltage level and is not reduced by the memory card device 400 or the link training of PCIe mode has been failing; however, this is not intended to be a limitation.

Further, it should be noted that in the embodiment of FIG. 6, since no clock signal SDCLK corresponding to the SD mode is received, e.g. the level of signal SDCLK is keep at the low voltage level 0 Volts, the memory card device 400 does not enter the SD mode from the initial state.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An SD memory card device to be coupled to an electronic device, the electronic device to be at a host and having a first external signal port, the SD memory card device at least being able to operate under an SD mode and comprising:
a second external signal port having multiple pins to be electrically coupled to multiple pins of the first external signal port of the electronic device;
a flash memory; and
a flash memory controller to be coupled between the flash memory and the second external signal port and comprising:
a register, configured for temporarily storing information of the flash memory; and
a processing circuit, coupled to the register,
wherein the flash memory controller is configured to:
receiving a first power signal, corresponding to the SD mode, sent from the electronic device through the first external signal port and a pin VDD1 of the second external signal port, to control and make the SD memory card device enter an initial state;
receiving a second power signal sent from the electronic device through one among a pin VDD2 and a pin VDD3 of the second external signal port, to control and make the SD memory card device enter a Linkup state of a PCIe mode, a voltage level of the second power signal being lower than a voltage level of the first power signal;
communicating with the electronic device based on a communication connection protocol in the Linkup state of the PCIe mode;
controlling the processing circuit to operate under the PCIe mode if the communication connection protocol succeeds; and
receiving a command CMD0 corresponding to the SD mode at a pin CMD employed by the SD mode or receiving a specific clock SDCLK corresponding to the SD mode at a pin CLK employed by the SD mode through the first external signal port and the second external signal port, to control and make the SD memory card device enter the SD mode from the Linkup state if the communication connection protocol fails; and
wherein a plurality of pins, used for a data line, of an UHS-I input/output communication interface standard employed by the SD mode of the SD memory card device are shared to be used by another input/output communication interface standard of a PCIe channel with an NVMe protocol employed by the PCIe mode; the plurality of pins used as the data line in the SD mode comprise pins of pin numbers 1, 7, 8, and 9.

2. The SD memory card device of claim 1, wherein when the SD memory card device is at the Linkup state of the PCIe mode, the flash memory controller controls the SD memory card device go back to the initial state from the Linkup state when the processing circuit detects that the second power signal of the PCIe mode is disabled.

3. An SD memory card device to be coupled to an electronic device, the electronic device to be at a host and having a first external signal port, the SD memory card device at least being able to operate under an SD mode and comprising:
   a second external signal port having multiple pins to be electrically coupled to multiple pins of the first external signal port of the electronic device;
   a flash memory; and
   a flash memory controller being coupled between the flash memory and the second external signal port and comprising:
      a register, used for temporarily storing information of the flash memory; and
      a processing circuit, coupled to the register,
   wherein the flash memory controller is configured to:
      receiving a first power signal, corresponding to the SD mode, sent from the first external signal port and a pin VDD1 of the second external signal port from the electronic device, to control and make the SD memory card device enter an initial state;
      receiving a command CMD0, corresponding to the SD mode, through the pin CMD employed by the SD mode sent from the electronic device, or receiving a specific clock SDCLK, corresponding to the SD mode, through a pin CLK employed by the SD mode sent from the electronic device, to control and make the SD memory card device enter the SD mode from the initial state and operated under the SD mode;
      receiving a command CMD8 through the pin CMD sent from the electronic device, the command CMD8 being used for querying whether the SD memory card device supports a PCIe mode;
      using the processing circuit to respond the electronic device that the secure digital memory card device does not support the PCIe mode and maintaining the SD memory card device at the SD mode if the SD memory card device does not support the PCIe mode; and
      using the processing circuit to respond the electronic device that the SD memory card device supports the PCIe mode and then receiving a second power signal through one among a pin VDD2 and a pin, VDD3 of the second external signal port sent from the electronic device if the SD memory card device supports the PCIe mode, to control and make the SD memory card device enter a Linkup state of the PCIe mode, a voltage level of the second power signal being lower than a voltage level of the first power signal; and
   wherein a plurality of pins, used for a data line, of an UHS-I input/output communication interface standard employed by the SD mode of the SD memory card device are shared to be used by another input/output communication interface standard of a PCIe channel with an NVMe protocol employed by the PCIe mode, and the plurality of pins of the UHS-I input/output communication interface standard employed by the SD mode comprise pins of pin numbers 1, 7, 8, and 9.

4. The SD memory card device of claim 3, wherein the flash memory controller is used for:
   communicating with the electronic device based on a communication connection protocol in the Linkup state of the PCIe mode;
   controlling the SD memory card device to operate under the PCIe mode if the communication connection protocol succeeds; and
   receiving the command CMD0, corresponding to the SD mode, at the pin CMD employed by the SD mode or receiving the specific clock SDCLK, corresponding to the SD mode, at the pin CLK employed by the SD mode through the first external signal port and the second external signal port if the communication connection protocol fails, to control and make the SD memory card enter the SD mode from the Linkup state.

5. The SD memory card device of claim 4, wherein when the SD memory card device is in the Linkup state of the PCIe mode, the flash memory controller is used to control the SD memory card device go back to the initial state from the Linkup state if the processing circuit detects that the second power signal of the PCIe mode is disabled.

\* \* \* \* \*